United States Patent [19]

Schmitt et al.

[11] 4,190,829
[45] Feb. 26, 1980

[54] CURRENT/FLOW COMPARATOR

[75] Inventors: Nickolas Schmitt; Sterling C. Barton, both of Scotia; Lawrence E. Jordan, Amsterdam, all of N.Y.

[73] Assignee: General Electric Company, Schenectady, N.Y.

[21] Appl. No.: 942,478

[22] Filed: Sep. 15, 1978

[51] Int. Cl.[2] .......... G08B 19/00; H02K 9/24
[52] U.S. Cl. .................. 340/606; 340/664; 73/196; 310/68 C; 310/53
[58] Field of Search ............ 340/606, 611, 664, 522; 310/68 C, 53, 54, 58; 322/33, 34; 73/196; 361/24, 78, 87; 364/510, 571; 235/92 FL

[56] References Cited

U.S. PATENT DOCUMENTS

| 2,761,284 | 9/1956 | Malick | 364/510 |
|---|---|---|---|
| 3,010,401 | 11/1961 | Granquist | 310/68 C |
| 3,665,945 | 5/1972 | Orrenstein | 364/510 |
| 3,822,389 | 7/1974 | Kudlacik | 310/53 |
| 4,021,794 | 5/1977 | Carlson | 340/522 |
| 4,090,179 | 5/1978 | Hirand | 73/196 |
| 4,101,874 | 7/1978 | Denison et al. | 340/606 |

FOREIGN PATENT DOCUMENTS 2455030  5/1976  Fed. Rep. of Germany ........... 340/606

Primary Examiner—Gerald Brigance
Attorney, Agent, or Firm—John F. Ahern; James W. Mitchell; Ormand R. Austin

[57] ABSTRACT

A current/flow comparator for generating an alarm signal whenever the instantaneous flow rate of a coolant fluid cooling the armature of a dynamoelectric machine falls below a predetermined percentage of a desired instantaneous flow rate, which desired flow rate varies as a function of the square of the instantaneous current flowing through the armature, is disclosed.

9 Claims, 1 Drawing Figure

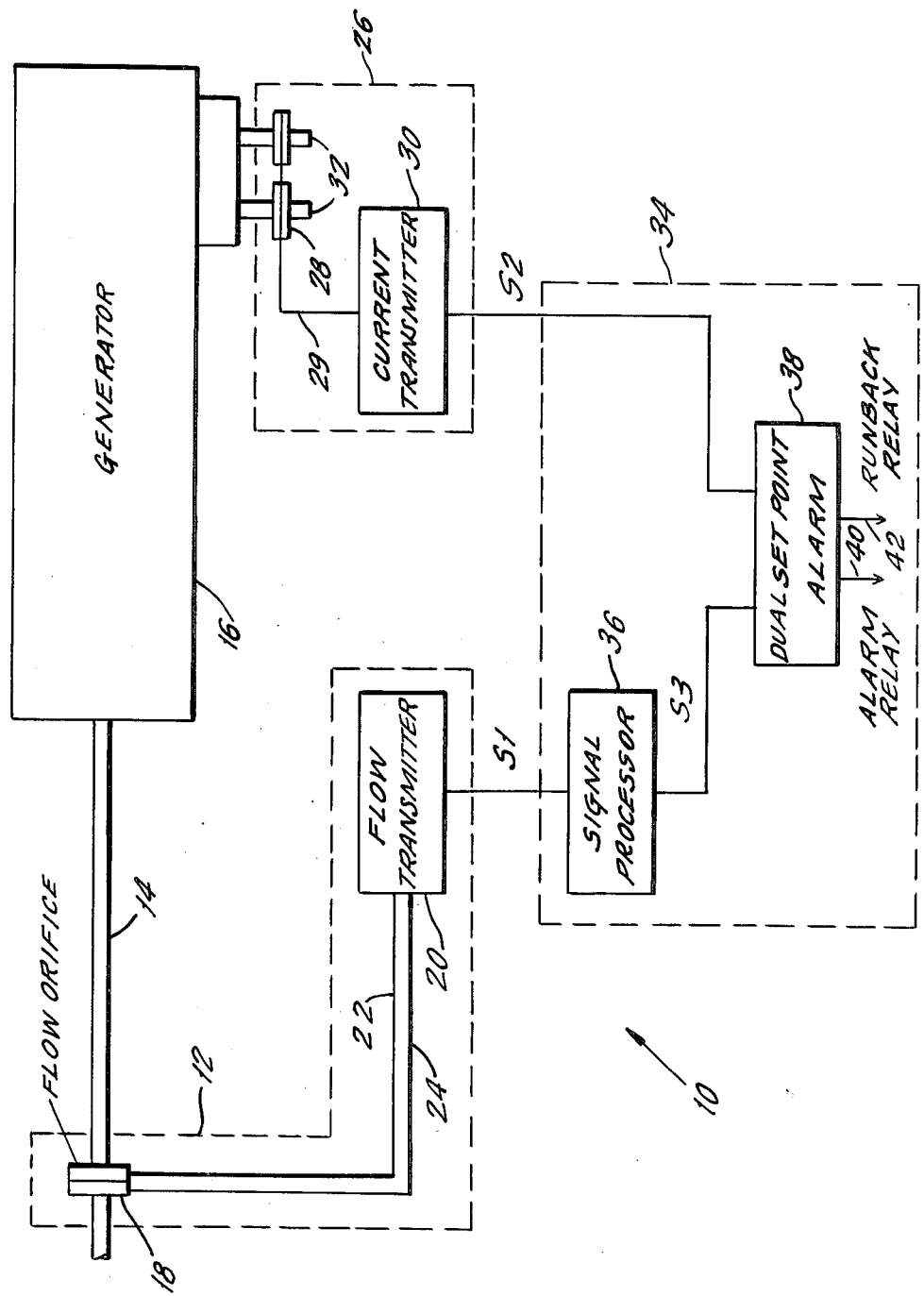

CURRENT/FLOW COMPARATOR

BACKGROUND OF THE INVENTION

The present invention is directed towards a current/flow comparator for monitoring the rate of flow of coolant through a dynamoelectric machine. More particularly, the present invention is directed towards a current/flow comparator which generates an alarm signal whenever the instantaneous rate of flow of a coolant fluid cooling the armature of the dynamoelectric machine falls below a predetermined percentage of a desired instantaneous flow rate, which desired flow rate varies as a function of the square of the instantaneous current flowing through the armature.

In large dynamoelectric machines, a coolant liquid is circulated through the conductors of the armature bars of the dynamoelectric machine for the purpose of cooling the armature. Several schemes for circulating the coolant fluid are disclosed in the prior art and are not directly part of the present invention. Exemplary of such systems are U.S. Pat. No. 3,693,036 issued to Nikolas Schmitt and U.S. Pat. No. 2,695,368 issued to C. E. Kilbourne. In each of these cooling systems, the cooling fluid serves to remove heat generated by the relatively high current flowing through the armature of the dynamoelectric machine. The heat generated by this current varies as a function of the square of the armature current. Accordingly, the rate of flow of coolant through the armature conductors required to satisfactorily cool the armature also varies as a function of the square of the armature current.

As long as the flow rate of the coolant fluid remains within a predetermined percentage of the desired flow rate determined by the actual armature current, sufficient cooling will take place to enable satisfactory operation of the dynamoelectric machine.

A primary object of the present invention is to monitor the difference between the actual flow rate and the desired rate and to generate a first alarm signal whenever the actual flow rate falls below a first predetermined percentage of the desired flow rate. This signal may then be utilized to activate a human perceivable alarm which indicates that the flow rate of cooling fluid through the dynamoelectric machine should be manually increased.

A further object of the present invention is to generate a second, operative control signal when the flow rate falls below a second predetermined percentage of the desired flow rate. This signal may then be utilized to automatically adjust the loading of the dynamoelectric machine to insure that it will not be damaged by the heat generated in the armature thereof. Yet other objects of the present invention will become apparent from a reading of the following description of the invention.

BRIEF SUMMARY OF THE INVENTION

The foregoing and other objects of the invention are obtained by providing:

1. means for generating a first signal representative of the instantaneous value of the flow rate of a coolant fluid cooling the armature of a dynamoelectric machine;
2. means for generating a second signal representative of the instantaneous value of the current flowing through the armature of the dynamoelectric machine; and
3. means responsive to the first and second signals for generating first and second signals whenever the instantaneous armature coolant flow rate falls below a desired instantaneous flow rate, determined as a function of the square of the instantaneous armature current, by more than first and second predetermined percentages, respectively.

BRIEF DESCRIPTION OF THE DRAWING

For the purpose of illustrating the invention, there is shown in the drawing an embodiment thereof which is presently preferred; it being understood, however, that this invention is not limited to the precise arrangements and instrumentalities shown.

The sole FIGURE is a block diagram of a current/flow comparator constructed in accordance with the principles of the present invention.

DETAILED DESCRIPTION OF THE PREFERRED EMBODIMENT

Referring now to the drawings wherein like numerals indicate like elements, there is shown in FIG. 1 a current/flow comparator construction in accordance with the principles of the present invention and designated generally as 10.

Current/flow comparator 10 comprises a flow orifice 18 and a flow transmitter 20 and generates a first signal S1 representative of the instantaneous value of the rate of flow of a coolant liquid passing through cooling conduit 14. The coolant liquid in cooling conduit 14 flows through armature stator bars of generator 16 and serves to cool the armature thereof. One suitable system in which the coolant fluid is supplied to the armature is shown in U.S. Pat. No. 3,693,036 issued to Nikolas Schmitt. Any other suitable liquid coolant distribution arrangement may be utilized. Whichever arrangement is used, output signal S1 is representative of the actual instantaneous value of the flow rate of the coolant cooling the aramature of generator 16.

Flow orifice 18 is a commercially available venturi which creates a differential pressure at the input and output thereof. This pressure varies as a function of the square of the rate of flow of fluid through conduit 14. A typical flow orifice may provide a pressure differential of anywhere from 0-150 inches of water. This pressure differential is transmitted on lines 22 and 24 to flow transmitter 20.

Flow transmitter 20 serves to convert the differential pressure sensed on line 22, 24 into an output signal which varies as a function of the square root of the differential pressure across flow orifice 18. As such, signal S1 varies as a direct function of the rate of flow in conduit 14. While any desirable flow transmitter 20 may be utilized, one suitable transmitter is manufactured by Fisher Controls Company under the designation Type 1151 DP Flow Transmitter. This particular unit generates an output dc current which varies in value between 4 and 20 mA (for example) as a function of the square root of the pressure differential.

Comparator 10 further includes a current transformer 28 and a current transmitter 30 which generates a second output signal S2 which is representative of the instantaneous value of the output current from the armature of generator 16. Current transformer 28 is inductively coupled to the high voltage buss 32 of generator 16 and, produces a signal of, for example, 0-5 amps ac at its output 29. The signal at output 29 is indicative of the magnitude of the current flow in one phase of the 3-phase generator output. The output of current transformer 28 is applied to current transmitter 30 which converts the current signal generated by transformer 28 into a dc output voltage. One suitable current transmitter is a model M-11 ACT manufactured by Moore Industries, Inc. Such a unit contains an ac to dc converter, an output amplifier and an independent power supply. This particular current transmitter converts a current of 0-5 amps ac into a dc signal having a range of, for example, 1-5 volts dc.

The signals generated by circuit elements 20 and 30 are applied eventually as signals S3 and S2 to circuit element 38. A dual set point alarm 38 generates a first alarm signal whenever the instantaneous flow rate of fluid in conduit 14 falls below the desired instantaneous flow rate determined by the instantaneous armature current by more than a first predetermined percentage and a second operative control signal whenever the instantaneous flow rate in conduit 14 falls below the desired instantaneous flow rate determined by the armature current by more than a second predetermined percentage. As noted above, the desired instantaneous flow rate required for satisfactory cooling of the armature of generator 16 varies as a function of the square of the armature current. Accordingly, means for comparing the instantaneous flow rate indicated by first signal S1 with the square of the instantaneous armature current indicated by second signal S2 is required. This result may be achieved by either squaring the value of the second signal S2 (which is proportional to the actual instantaneous armature current) or by taking the square root of signal S1 (which is proportional to the actual instantaneous flow rate in conduit 14). In the preferred embodiment described below, the square root of the flow signal S1 is obtained. It should be recognized by those skilled in the art that the same result may be achieved by squaring the armature current signal S1.

Returning now to the drawing, signal processor 36 receives the first signal S1 and generates a third signal S3 which is proportional to the square root of signal S1, and therefore proportional to the square root of the rate of flow of fluid through conduit 14. Signal S3 is applied to one input of dual set point alarm 38. One suitable signal processor 36 is manufactured by Moore Industries, Inc. under the designation Model M-11 SRT. This unit includes an input buffer, a square root function generator and output amplifier as well as its own power supply. This signal processor accepts the dc current generated by flow transmitter 20 and converts it into a dc voltage which is proportional to the square root of the magnitude of the dc input current.

A second input of dual set point alarm 38 receives the output of current transmitter 30. Since the desired relationship between the magnitude of armature current and the magnitude of fluid flow through conduit 14 has been imposed by signal processor 36, the two dc signals S2 and S3 may be directly compared by dual set point alarm 38. Dual set point alarm 38 is preferably a commercially available alarm which compares the dc voltages represented by signals S2 and S3 and produces a first alarm signal on line 40 whenever the magnitude of the third signal S3 (and therefore the instantaneous flow rate of coolant through line 14) falls below a first predetermined percentage (for example, 10%) of the magnitude of the signal S2 (and therefore the desired instantaneous rate determined by the instantaneous current in the armature of generator 16) and a second operative control signal on line 42 whenever the magnitude of third signal S3 falls below a second predetermined (for example, 15%) percentage of the magnitude of signal S2.

A commercially available dual set point alarm 38 is manufactured by Fisher Controls Company under the designation Model LS 132 Alarm Unit. This unit compares the voltages represented by signals S2 and S3 and generates an error signal representative of the difference between the magnitude of the two signals. When this error signal reaches a first level the first alarm signal is generated. When this error signal reaches a second level, the second control signal is generated. In both cases, the set points (which determine the above noted first and second percentages) are manually adjustable.

In a preferred application of the present invention, output line 40 is coupled to an alarm and control circuit which generates an appropriate audio and/or visual alarm which informs the power station operator to manually increase the flow rate and/or reduce armature current. The second output of 42 is preferably connected to a runback relay which automatically reduces steam input to the turbine driving generator 16 so as to reduce the load on the turbine until the error signal falls below a predetermined value representing the safe level of operation of generator 16. Alternatively, other load reduction sequences may be initiated.

The present invention may be embedded in other specific forms without departing from the spirit or essential attributes thereof and, accordingly, reference should be made to the appended claims, rather than to the foregoing specification as indicating the scope of the invention.

What is claimed is:

1. A current/flow comparator for generating an alarm signal whenever the instantaneous flow rate of a coolant liquid cooling the armature of a dynamoelectric machine falls below a predetermined percentage of a desired instantaneous flow rate, which desired instantaneous flow rate varies as the square of the actual instantaneous current flowing through said armature, said comparator comprising:
   means for generating a first signal representative of the actual instantaneous value of said flow rate;
   means for generating a second signal representative of the actual instantaneous value of said armature current; and
   means responsive to said first and second signals for generating an alarm signal whenever said instantaneous flow rate falls below said desired instantaneous flow rate by more than said predetermined percentage.

2. The current/flow comparator of claim 1, and further comprising:
   signal processor means responsive to said first signal for generating a third signal representative of the square root of said instantaneous flow rate; and
   dual set point signal generating means responsive to said second and third signals for generating an alarm signal whenever said instantaneous flow rate falls below said desired instantaneous flow rate by more than a predetermined percentage.

3. The current/flow comparator of claim 1, wherein said signal generating means also generates an operative control signal whenever said instantaneous flow rate falls below said desired instantaneous flow rate by more than a second predetermined percentage, said second predetermined percentage being greater than said first predetermined percentage.

4. The current/flow comparator of claim 3, wherein said first predetermined percentage is 10%.

5. The current/flow comparator of claim 4, wherein said second predetermined percentage is 15%.

6. The current/flow comparator of claim 1, wherein said first named means further comprises:

flow orifice means coupled to a conduit through which said coolant liquid flows for creating a pressure differential in said conduit which varies as the function of the square of said flow rate and for generating an output signal representative of the magnitude of said pressure differential; and flow transmitter means for generating an output signal whose magnitude is proportional to the square root of the output signal generated by said flow orifice means, said output signal of said flow transmitter means defining said first signal.

7. The current/flow comparator of claim 6, and further comprising:

current transformer means coupled to a high voltage buss carrying current from said armature, said current transformer means for generating an output current whose magnitude is proportional to the magnitude of current flowing through said armature; and current transmitter means coupled to said current transformer means for generating a dc output signal whose magnitude is proportional to the magnitude of said armature current.

8. The current/flow comparator of claim 7, and further comprising:

signal processor means responsive to said first signal for generating a dc output signal whose magnitude is proportional to the square root of the magnitude of said first signal, said output signal of said signal processor means defining said third signal; and dual set point signal generating means responsive to said second and third signals for generating an alarm signal when the magnitude of said third signal falls below the magnitude of said second signal by an amount corresponding to said predetermined percentage.

9. The current/flow comparator of claim 8, wherein said dual set point signal generating means further generates an operative control signal when the magnitude of said third signal falls below the magnitude of said second signal by a second amount corresponding to a second predetermined percentage, said second predetermined percentage being greater than said first predetermined percentage.

* * * * *